United States Patent
Malakian et al.

(10) Patent No.: US 8,085,186 B1
(45) Date of Patent: Dec. 27, 2011

(54) PROBABILISTIC CLASSIFIER

(75) Inventors: Kourken Malakian, Mount Laurel, NJ (US); Christopher J. Dahmen, Haddon Heights, NJ (US); Sabrina M. Chowdhury, Mount Laurel, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 699 days.

(21) Appl. No.: 12/178,290

(22) Filed: Jul. 23, 2008

(51) Int. Cl.
 *G01S 13/72* (2006.01)
(52) U.S. Cl. ............. 342/95; 342/90; 342/62; 342/101; 342/195
(58) Field of Classification Search .............. 342/95–97, 342/90, 91, 101, 62, 195
 See application file for complete search history.

(56) References Cited

U.S. PATENT DOCUMENTS

| | | | | |
|---|---|---|---|---|
| 5,313,212 A | * | 5/1994 | Ruzicka | 342/101 |
| 5,525,995 A | * | 6/1996 | Benner | 342/90 |
| 5,798,942 A | * | 8/1998 | Danchick et al. | 342/96 |
| 6,527,222 B1 | | 3/2003 | Redano | |
| 6,739,547 B2 | | 5/2004 | Redano | |
| 7,016,884 B2 | | 3/2006 | Platt et al. | |
| 7,026,979 B2 | * | 4/2006 | Khosla | 342/90 |
| 7,026,980 B1 | * | 4/2006 | Mavroudakis et al. | 342/90 |
| 7,180,443 B1 | * | 2/2007 | Mookerjee et al. | 342/195 |
| 7,181,323 B1 | | 2/2007 | Boka et al. | |
| 7,295,149 B1 | * | 11/2007 | Wolf | 342/90 |
| 7,411,543 B1 | * | 8/2008 | Boka | 342/90 |
| 7,567,203 B2 | * | 7/2009 | Dizaji et al. | 342/90 |
| 7,663,528 B1 | * | 2/2010 | Malakian et al. | 342/13 |
| 7,898,466 B1 | * | 3/2011 | Malakian et al. | 342/95 |
| 2005/0001759 A1 | * | 1/2005 | Khosla | 342/90 |
| 2007/0253625 A1 | | 11/2007 | Yi | |

* cited by examiner

*Primary Examiner* — John Sotomayor
(74) *Attorney, Agent, or Firm* — Howard IP Law Group, PC

(57) ABSTRACT

A computer-implemented method for probabilistically classifying an occurrence of an event, a change in the state of a target, includes measuring feature data of the target simultaneously processing the measured feature data through first and second filters. The first filter is suited for a situation in which the target is in a first state and generates a first residual and a first residual covariance for the measured feature data. The second filter is suited for a situation in which the target is in a second state and generates a second residual and a second residual covariance for the feature data. By determining a probability of the occurrence of the event and the probability of the non-occurrence of the event and comparing the two probabilities with at least one threshold value the occurrence or non-occurrence of the event is determined.

7 Claims, 5 Drawing Sheets

PROBABILISTIC CLASSIFIER

GOVERNMENTAL INTEREST

This invention was made with government support under Contract/Grant BMD 4.0. The United States Government has a non-exclusive, non-transferable, paid-up license in this invention.

CROSS-REFERENCE TO RELATED APPLICATION

None

FIELD OF THE INVENTION

This disclosure relates to probabilistic classification methods.

BACKGROUND

Many probabilistic classification methods are used to allow machine (e.g. computers) to classify or identify objects. However, accurate automated methods of identifying or recognizing an occurrence of an event has not been available.

SUMMARY

The following summary is a description of one preferred embodiment of the invention in order to provide a basic understanding of some aspects of the invention and is not intended to identify key/critical elements of the invention.

According to an embodiment of the present disclosure, a computer-implemented method for probabilistically classifying a change in the state of a target being monitored is disclosed. During a defined time duration, a feature data associated with the target is measured. The measured feature data is simultaneously processed through first and second filters. The first filter is suited for a situation in which the target is in a first state and generates a first residual and a first residual covariance for the measured feature data. The second filter is suited for a situation in which the target is in a second state and generates a second residual and a second residual covariance for the feature data. Next, a probability of the first state is determined from the first residual and the first residual covariance and a probability of the second state is determined from the second residual and the second residual covariance. The state of the target is then determined by comparing the probabilities of the first and second states to a threshold value, wherein the target is deemed to be in the first state if the probability of the first state is greater than the threshold value and the target is deemed to be in the second state if the probability of the second state is greater than the threshold value.

BRIEF DESCRIPTION OF THE DRAWINGS

These and other features and advantages of the present invention will be more fully disclosed in the following detailed description, which is to be considered together with the accompanying drawings wherein like numbers refer to like parts, and further wherein.

DETAILED DESCRIPTION

The method of the present disclosure is applicable to probabilistically classifying a change in the state of a target being monitored. The target is monitored by sensing or measuring one or more features of the target where the features are something whose monitored characteristics changes as the target goes from state A to sate B. This will be referred to herein as the feature data. In one preferred embodiment, the monitoring of the target is performed by a computerized system comprising a processor in which a set of coded programming instructions are executed to perform the method of the present disclosure.

Figure 1:
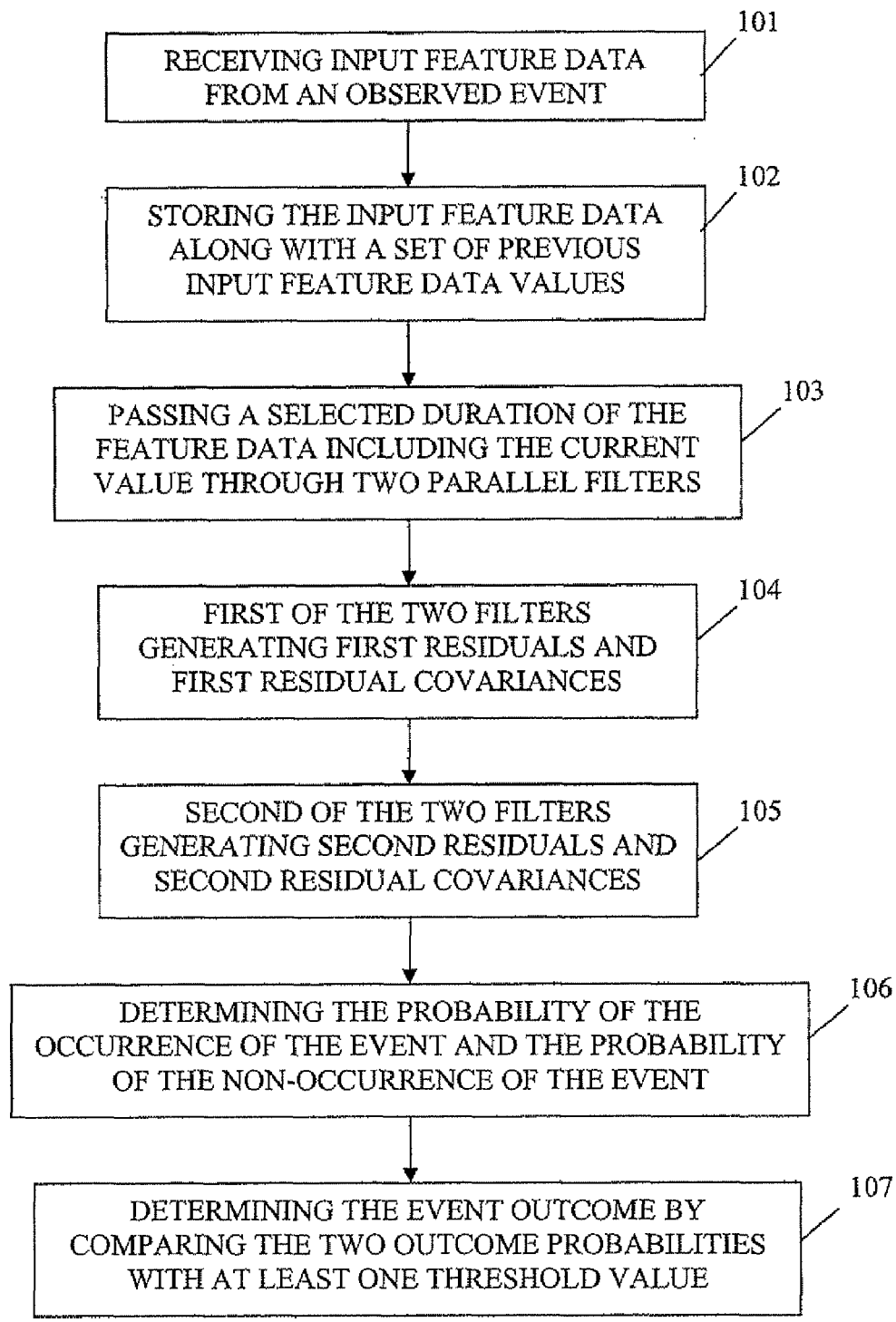
FIG. 1 is a flow diagram illustrating a method according to an embodiment of the present disclosure.

Referring to the flow diagram 100 of FIG. 1, generally, the target is monitored for a duration of time in order to determine whether the target is in state A or state B. During that monitoring time, the input feature data is received from an observed event (See block 101). The current data value of each of the sensed feature data is stored together with a set of previous data values for each of the features (See block 102).

According to an embodiment, a selected duration of the feature data including the current value is simultaneously processed through two parallel filters having a fixed filter lag (See block 103). The fixed filter lag is a fixed duration utilized to improve computational efficiency by reducing error in near real time processing. The probabilities of state A and state B are calculated from the output of the each filters (the residuals and residual covariances). The probabilities identify the target's state.

The filters are probabilistic classifiers that recognize the state in which the target exists. The first filter, designated $\alpha$-filter, is suited for a situation in which the target is in state A and generates first residuals and first residual covariance (See block 104). The second filter, designated $\alpha$-$\beta$ filter, is suited for a situation in which the target is in state B and generates second residuals and second residual covariance (See block 105).

The first filter generates a pair of a first residual and a first residual covariance for each of the feature data as they are received and collected during the monitoring period. The second filter generates a pair of a second residual and a second residual covariance for each of the feature data as they are received and collected during the monitoring period.

From the sets of first residuals, the first residual covariances, the second residuals, and the second residual covariances, the probability of state A and the probability of state B are respectively determined (See block 106). The probability of state A tends toward unity when the target is in state A and tends toward zero when the target is in state B. The probability of state B tends toward unity when the target is in state B and tends toward zero when the target is in state A.

Then, the probability of state A and the probability of state B are compared with at least one threshold value, a predetermined value set prior to the processing of the feature data through the two filters (See block 107). The target is deemed to be in the state A if the probability of state A exceeds the threshold value, and the target is deemed to be in the state B if the probability of state B exceeds the threshold value.

In one preferred embodiment, the probabilistic classification method is applied to monitoring whether an incoming hostile ballistic missile was a successfully intercepted by an interceptor, i.e., a kill or a no kill. The target, in such example, is the incoming ballistic missile target is monitored by sensing and processing reflected radar signals from the target, through a radar and signal processor, and storing the collected information pertaining to the target as sets of feature data. In this example, the state A of the incoming ballistic object can be a no-kill state meaning the interceptor missed and the state B of the incoming ballistic object can be a kill state meaning the interceptor successfully intercepted the incoming ballistic object.

The feature data can be sensed data on one or more features of the incoming ballistic missile that can be discerned from the reflected radar signal. One example of such feature is the length of the ballistic missile. The first filter, $\alpha$-filter, is suited for a situation in which the ballistic missile is in state A, a no-kill state, and generates first residuals and first residual covariances. At least a portion of the current value of the feature data is passed through a second filter having a fixed second filter lag. The second filter, $\alpha$-$\beta$ filter, is suited for a situation in which the ballistic missile is in state B, a kill state, and generates second residuals and second residual covariances.

The $\alpha$-filter comprises the following components: The $\alpha$ filter predictor equation $$x_k^p = x_{k-1}^s,$$

the $\alpha$ filter gain equation $$\alpha = \left(\frac{T}{T+\tau}\right),$$

and
the $\alpha$ filter corrector equation $$x_k^s = x_k^p + \alpha(x_k^m - x_k^p).$$

Where,
x=feature data point,
$x^m$=measured data,
$x^p$=predicted data,
$x^s$=corrected data,
$\alpha$=Filter position gain based on filter lag,
T=Measurement update time, and
$\tau$=Fixed Lag.

The $\alpha$-$\beta$ filter comprises the following components: The $\alpha$-$\beta$ filter predictor equations $$x_k^p = x_{k-1}^s + \dot{x}_{k-1}^s \Delta \text{ and}$$

$$\dot{x}_k^p = \dot{x}_{k-1}^s,$$

the $\alpha$-$\beta$ filter gain equations $$\alpha_x = 1 - \left(\frac{\tau}{T+\tau}\right)^2 \text{ and } \beta_x = 2\left(\frac{\tau}{T+\tau}\right)^2,$$

and
the $\alpha$-$\beta$ filter corrector equations $$x_k^s = x_k^p + \alpha_x(x_k^m - x_k^p) \text{ and}$$

$$\dot{x}_k^s = \dot{x}_k^p + \frac{\beta_x}{\Delta}(x_k^m - x_k^p).$$

Where,
x=feature data point,
$x^m$=measured data,
$x^p$=predicted data,
$x^s$=corrected data,
$\alpha$=Filter position gain based on filter lag,
$\beta$=Filter velocity gain based on filter lag,
T=Measurement update time,
$\tau$=Fixed Lag, and
$\Delta = t_i - (t_{i-1})$.

As the series of measured feature data points are processed through the two filters, for the very first measured feature data point, $x^m$, $x_{k-1}^s$ is deemed to be equal to $x_k^m$ and in turn, $x_k^p$ is deemed to be equal to $x_k^m$.

As mentioned above, for every data point in time a residual $V_i^n$ and a residual covariance $S_i^n$ are determined by each of the $\alpha$ filter and the $\alpha$-$\beta$ filters. A residual is $$v_i^n = (x^m - x^p) \text{ and a residual covariance is}$$

$$S_i^n = \left(\frac{\sigma_{(n)m_i}^2}{(1-\alpha_i^n)}\right).$$

Where
i=1, No kill mode,
i=2, Kill mode, and
n=observation time.

The residual is the predicted data point $x^p$ subtracted from the measured data point $x^m$. The resulting two residual data sets are compiled; one set determined from the kill filter ($\alpha$-$\beta$ filter) outputs, and one set determined from the no kill filter ($\alpha$ filter) outputs. Residual covariances, $S_i^n$, are calculated from the residual data.

From the first residuals, the first residual covariances, the second residuals, and the second residual covariances, the probability of no-kill $\mu_1^n$ (state A) and the probability of kill $\mu_2^n$ (state B) are determined. The mode probabilities are represented by $$\mu_i^n = \frac{\Lambda_i^n \mu_i^{n-1}}{\Lambda_1^n \mu_1^{n-1} + \Lambda_2^n \mu_2^{n-1}}, i = 1, 2$$

Where,
i=1, No kill mode,
i=2, Kill mode,
n=observation time, and
$\Lambda_i^n$=likelihood function.

The likelihood function, $\Lambda_i^n$ can be determined by $$\Lambda_i^n = \frac{e^{[-\frac{1}{2}(v_i^n)^T(S_i^n)^{-1}(v_i^n)]}}{(2\pi)^{\frac{3}{2}}|S_i^n|^{\frac{1}{2}}}.$$

The probability of no kill $\mu_1^n$ tends toward unity when the target object has not been successfully intercepted and tends toward zero when the target object has been successfully intercepted. The probability of kill $\mu_2^n$ tends toward unity when the target object has been successfully intercepted and tends toward zero when the target object has not been successfully intercepted.

The probability of no-kill $\mu_1''$ and the probability of kill $\mu_2''$ are compared with at least one threshold value, TH, a predetermined value set prior to feature data filtering, and the state of the target object is deemed a kill if the probability of kill $\mu_2''$ exceeds the threshold value TH, and the state of the target object is deemed to be a no kill if the probability of no kill $\mu_1''$ exceeds the threshold value TH. The threshold value TH is determined appropriately for each application such that the system noise does not affect the probability calculations. For example, imagine that the probability of kill in FIG. 4 was to initially fluctuate between 0.4 and 0.6 over time and after some duration grows to 0.8. If a TH value was previously determined to be 0.7, the probability would have crossed the TH and would be declared a kill. However, if the TH value was previously determined to be 0.9, the TH value would not be exceeded, and therefore a No Kill would be declared. Thus, the output of the present method can be used to determine the appropriate follow on action. After engagement by the interceptor, the target may exist in a kill state, where the target is no longer deemed a threat, or in a no kill state, where the target is still considered a threat.

Figure 2:
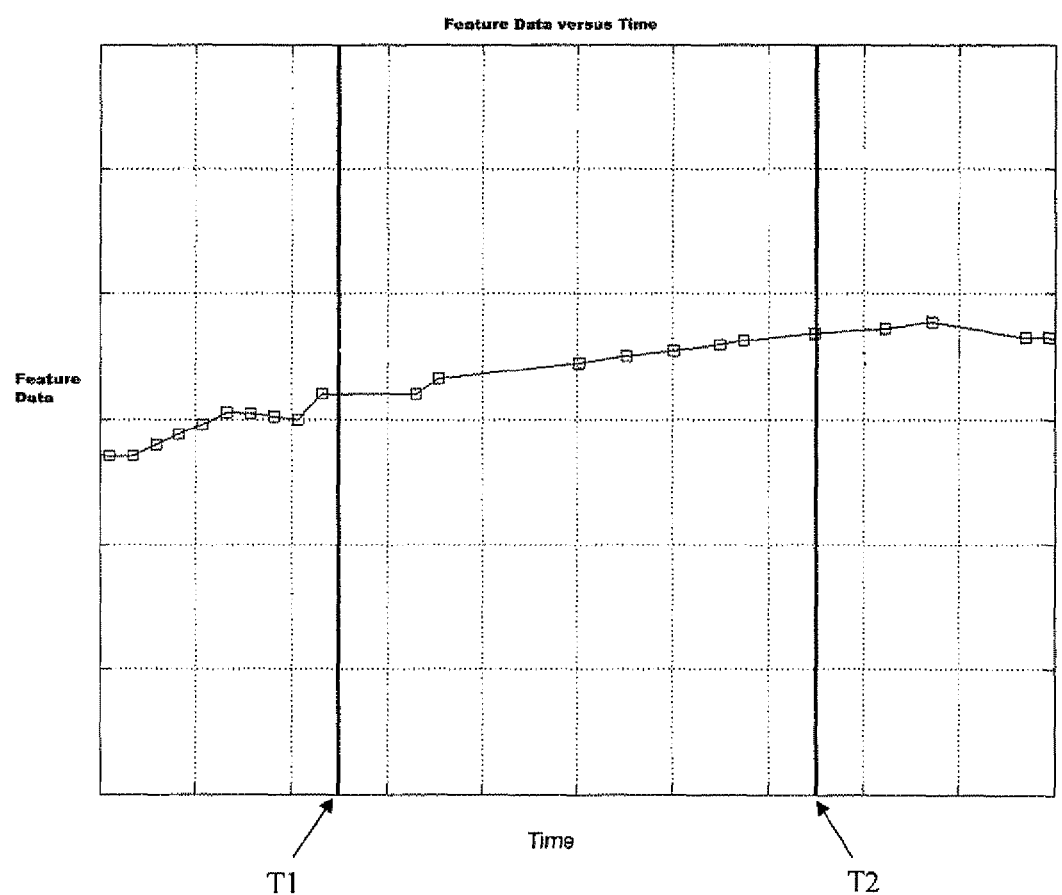
FIG. 2 is a plot over time of a series of feature data values received from an event observed.
Figure 3:
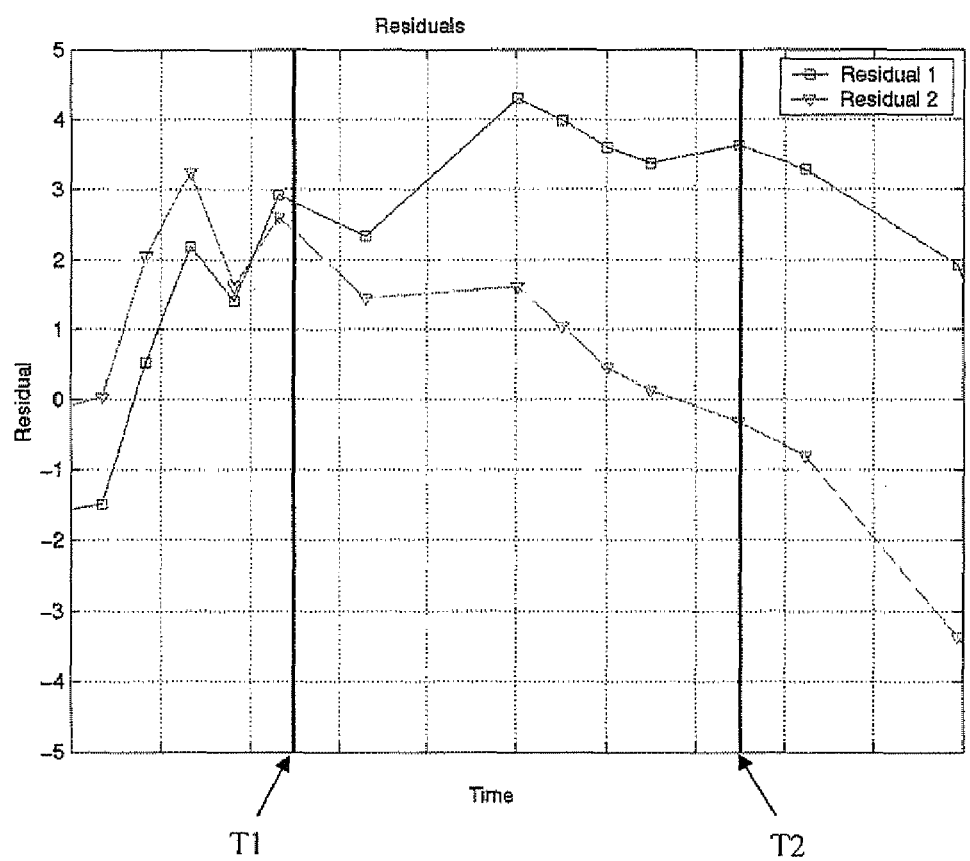
FIG. 3 is a plot over time of residuals generated by the $\alpha$ filter and the $\alpha$-$\beta$ filter based on the feature data values of FIG. 2.
Figure 4:
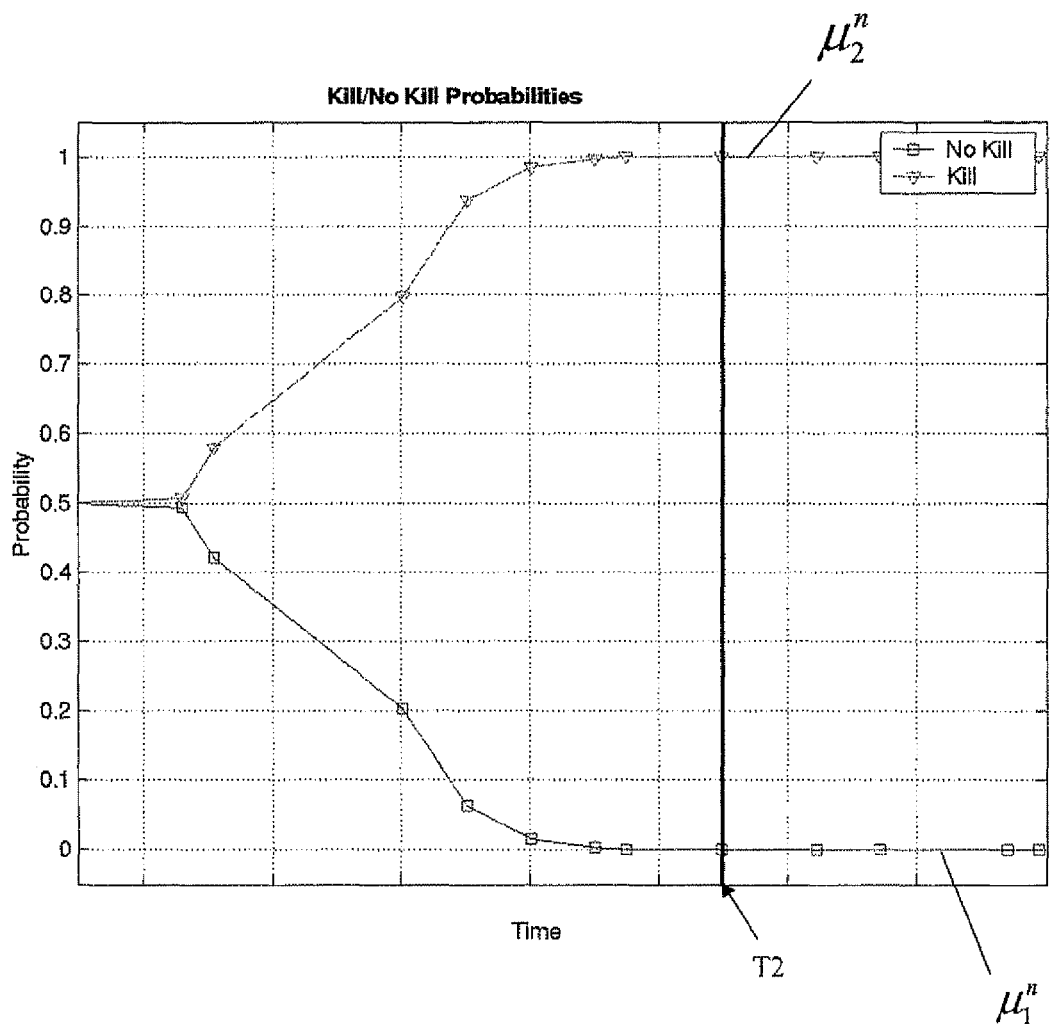
FIG. 4 is a plot over time of mode probabilities calculated from the residuals of FIG. 3.

The above exemplary application of the method for determining whether an incoming ballistic object, such as a hostile missile, was successfully intercepted or not by an interceptor will be described further in conjunction with the FIG. 2-4. FIG. 2 shows a plot over time of a series of measured feature data values. FIG. 3 shows a plot over time of the residuals output from the two filters. The plot line "Residual 1" represents the plot of residuals from the first filter, $\alpha$ filter (suited for state A, no-kill). The plot line "Residual 2" represents the plot of residuals from the second filter, $\alpha$-$\beta$ filter (suited for state B, kill). FIG. 4 shows a plot over time of the mode probabilities calculated from the residuals and the residual covariances generated by the two filters. In this example, the mode probability of no-kill, $\mu_1''$ reaches the value zero. The mode probability of kill, $\mu_2''$ reaches the value of 1. The time point T1 shown in FIGS. 2-4 represent the time point when the target was intercepted by an interceptor. After a time duration T2, the mode probabilities $\mu_1''$ and $\mu_2''$ calculated by the method of the present disclosure have reached distinguishable values "1" or "0" and can classify the state of the target object as being in the killed state (state B). In other words the mode probability of kill $\mu_2''$ has attained the value of "1."

Another exemplary application of the method of the present disclosure is for automated trading of stocks or mutual funds. The feature data can be the stock's share price and if the price of a stock rises or falls beyond the normal fluctuation within a sliding window of time, the computer-implemented method of the present disclosure can recognize such fluctuation as a change in the state of the particular stock and shares of the stock can be automatically bought or sold. The sliding window of time can be any selected duration from minutes to years.

In another example, the method can be used to monitor a patient's medical state. The feature data can be any feature of the patient that can be monitored and observed by a sensor.

In another example, the method can be used for monitoring traffic congestion. A counter can monitor the speed and number of cars on a highway in a set duration. If the number and speed decreases beyond the normal fluctuation, the highway may be deemed congested and an alert may be sent to parties interested in this type of information.

Figure 5:
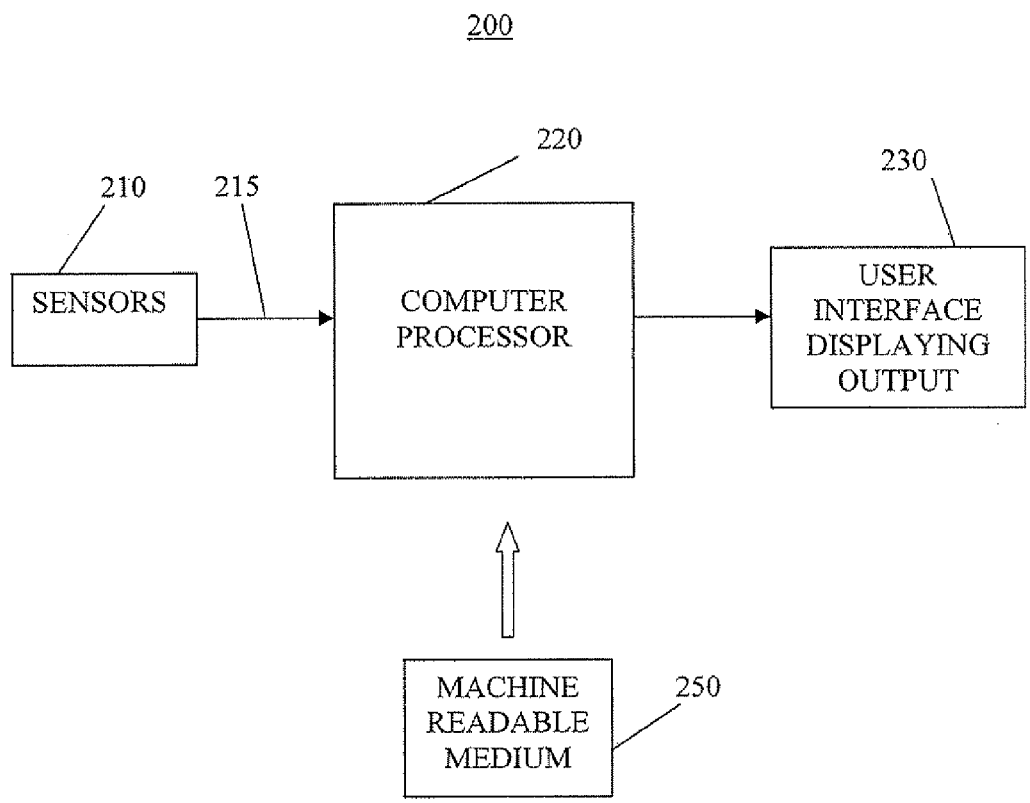
FIG. 5 is a schematic diagram of a system implementing the method of the present disclosure.

According to another aspect of the present disclosure, a computerized system 200 for executing the method described herein is schematically illustrated in FIG. 5. The system 200 comprises a sensor device 210 for measuring the feature data. In the illustrated example where an interception of an incoming ballistic missile is monitored by the system 200, the sensor device 210 can be a radar system for tracking and monitoring the incoming ballistic missile, and sensing one or more characteristic feature data related to the target incoming ballistic missile. The system 200 also includes a computer processor system 220 that receives the feature data 215 from the sensor device 210. The computer processor system 220 is preferably configured and adapted to execute a computer program code which when executed by the computer processor system 220, the computer processor system 220 performs the method for probabilistically classifying a change in the state of the target incoming ballistic missile being monitored. The system 200 also can include a user interface device 230 for displaying, printing, or otherwise delivering the output of the method of the present disclosure to the system's user. In one preferred embodiment, the computer processor system 220 is provided with one or more data storage devices necessary for operation of a typical computer processor system as well known in the art. The computer program code can be tangibly embodied in a computer-readable storage medium 250 as a software and loaded on to the computer processor system 220 or the computer program code can be provided in the computer processor system 220 as a firmware. Such computer-readable storage medium 250 can be a random access memory device, a read only memory device, a magnetic medium such as a hard-drive or a floppy disk, or an optical medium such as a Compact Disc, a DVD, etc.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A computer-implemented method for probabilistically classifying a change in the state of a target being monitored, said method comprising:

measuring a feature data associated with said target during a defined time duration;

processing said feature data simultaneously through first and second filters, said first filter suited for a situation in which said target is in a first state and generating a first residual and a first residual covariance for said feature data, said second filter suited for a situation in which said target is in a second state and generating a second residual and a second residual covariance for said feature data;

determining a probability of the first state from the first residual and the first residual covariance;

determining a probability of the second state from the second residual and the second residual covariance;

determining the state of said target by comparing the probabilities of the first and second states to a threshold value, wherein the target is deemed to be in the first state if the probability of the first state is greater than the threshold value and the target is deemed to be in the second state if the probability of the second state is greater than the threshold value.

2. The computer-implemented method of claim 1, wherein said first filter comprises a filter predictor equation $$x_k^p = x_{k-1}^s,$$

a filter gain equation $$\alpha = \left(\frac{T}{T+\tau}\right),$$

and

A filter corrector equation $$x_k^s = x_k^p + \alpha(x_k^m - x_k^p),$$

wherein
x=feature data point,
$x^m$=measured data,
$x^p$=predicted data,
$x^s$=corrected data,
α=Filter position gain based on filter lag,
T=Measurement update time, and
τ=Fixed Lag.

3. The computer-implemented method of claim 2, wherein said second filter comprises a filter predictor equations $$x_k^p = x_{k-1}^s + \dot{x}_{k-1}^s \Delta \text{ and}$$

$$\dot{x}_k^p = \dot{x}_{k-1}^s,$$

a filter gain equations $$\alpha_x = 1 - \left(\frac{\tau}{T+\tau}\right)^2 \text{ and } \beta_x = 2\left(\frac{\tau}{T+\tau}\right)^2,$$

and
a filter corrector equations $$x_k^s = x_k^p + \alpha_x(x_k^m - x_k^p) \text{ and}$$

$$\dot{x}_k^s = \dot{x}_k^p + \frac{\beta_x}{\Delta}(x_k^m - x_k^p),$$

wherein
β=Filter velocity gain based on filter lag, and
$\Delta = t_i - (t_{i-1})$.

4. The computer-implemented method of claim 3, wherein said first and second residuals are $$v_i^n = (x^m - x^p)$$

and said first and second residual covariances are $$S_i^n = \left(\frac{\sigma_{(n)m_i}^2}{(1-\alpha_i^n)}\right),$$

wherein
i=1 refers to said first state,
i=2 refers to said second state, and
n=observation time.

5. The computer-implemented method of claim 4, wherein said probability of the first state and said probability of the second state are represented by $$\mu_i^n = \frac{\Lambda_i^n \mu_i^{n-1}}{\Lambda_1^n \mu_1^{n-1} + \Lambda_2^n \mu_2^{n-1}}, i = 1, 2$$

wherein
$\Lambda_i^n$=likelihood function, said likelihood function determined by $$\Lambda_i^n = \frac{e^{[-\frac{1}{2}(v_i^n)^T(S_i^n)^{-1}(v_i^n)]}}{(2\pi)^{\frac{3}{2}}|S_i^n|^{\frac{1}{2}}}.$$

6. A machine-readable storage medium encoded with a computer program code, such that, when the computer program code is executed by a processor, the processor performs a method for probabilistically classifying a change in the state of a target being monitored, said method comprising:
measuring a feature data associated with said target during a defined time duration;
processing said feature data simultaneously through first and second filters, said first filter suited for a situation in which said target is in a first state and generating a first residual and a first residual covariance for said feature data, said second filter suited for a situation in which said target is in a second state and generating a second residual and a second residual covariance for said feature data;
determining a probability of the first state from the first residual and the first residual covariance;
determining a probability of the second state from the second residual and the second residual covariance;
determining the state of said target by comparing the probabilities of the first and second states to a threshold value, wherein the target is deemed to be in the first state if the probability of the first state is greater than the threshold value and the target is deemed to be in the second state if the probability of the second state is greater than the threshold value.

7. A computer system comprising the computer-readable storage medium of claim 6.

* * * * *

UNITED STATES PATENT AND TRADEMARK OFFICE
CERTIFICATE OF CORRECTION

| | | |
|---|---|---|
| PATENT NO. | : 8,085,186 B1 | Page 1 of 1 |
| APPLICATION NO. | : 12/178290 | |
| DATED | : December 27, 2011 | |
| INVENTOR(S) | : Kourken Malakian et al. | |

It is certified that error appears in the above-identified patent and that said Letters Patent is hereby corrected as shown below:

Column 1, line 7, please correct the following: "BMD4.0" should be --N00024-03-C-6110--.

Signed and Sealed this
Twenty-eighth Day of February, 2012

David J. Kappos
*Director of the United States Patent and Trademark Office*